US011126347B2

(12) United States Patent
Miao et al.

(10) Patent No.: US 11,126,347 B2
(45) Date of Patent: Sep. 21, 2021

(54) OBJECT BATCHING METHOD AND APPARATUS

(71) Applicant: BEIJING BYTEDANCE NETWORK TECHNOLOGY CO., LTD., Beijing (CN)

(72) Inventors: Huayun Miao, Beijing (CN); Dong Wang, Beijing (CN); Yonghao Luo, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/020,317

(22) Filed: Sep. 14, 2020

(65) Prior Publication Data

US 2020/0409525 A1  Dec. 31, 2020

Related U.S. Application Data

(63) Continuation of application No. PCT/CN2019/086781, filed on May 14, 2019.

(30) Foreign Application Priority Data

May 14, 2018 (CN) .......................... 201810457977.4

(51) Int. Cl.
*G06F 3/0488* (2013.01)
*G06F 3/0482* (2013.01)

(52) U.S. Cl.
CPC .......... *G06F 3/0488* (2013.01); *G06F 3/0482* (2013.01); *G06F 2203/04104* (2013.01)

(58) Field of Classification Search
CPC ................. G06F 3/0488; G06F 3/0482; G06F 2203/04104; G06F 2203/04808
See application file for complete search history.

(56) References Cited

U.S. PATENT DOCUMENTS

2014/0215365 A1* 7/2014 Hiraga .................. G06F 3/0488
                                                    715/765
2015/0106766 A1* 4/2015 Qiao ..................... G06F 3/0483
                                                    715/835
(Continued)

FOREIGN PATENT DOCUMENTS

CN          102799357 A      11/2012
CN          102915178 A       2/2013
(Continued)

OTHER PUBLICATIONS

International Patent Application No. PCT/CN2019/086781; Int'l Search Report; dated Jul. 26, 2019; 3 pages.

*Primary Examiner* — David D Davis
(74) *Attorney, Agent, or Firm* — BakerHostetler

(57) ABSTRACT

A batch processing method and device for objects are provided. In response to an operation that a user simultaneously touches at least two objects on a user interface, first touch event related information with respect to the at least two objects is acquired. Next, in response to an operation that the user stops touching the at least two objects on a batch processing interface, second touch event related information with respect to the at least two objects is acquired. Finally, if the first touch event related information with respect to the at least two objects and the second touch event related information with respect to the at least two objects meet an operation condition of a preset batch processing operation, the preset batch processing operation is performed for the at least two objects.

19 Claims, 6 Drawing Sheets

(56) References Cited

U.S. PATENT DOCUMENTS

2016/0328146 A1* 11/2016 Jing ................... G06F 3/041
2017/0052694 A1*  2/2017 Du .................... G06F 3/04883
2019/0034061 A1*  1/2019 Liu ................... G06F 3/04845

FOREIGN PATENT DOCUMENTS

| CN | 103577052 A |   | 2/2014 |           |
|----|-------------|---|--------|-----------|
| CN | 105824520 A |   | 8/2016 |           |
| CN | 105843497 A | * | 8/2016 |           |
| CN | 105843497 A |   | 8/2016 |           |
| CN | 106095234 A |   | 11/2016 |          |
| CN | 106896998 A |   | 6/2017 |           |
| CN | 106980433 A | * | 7/2017 |           |
| CN | 106980433 A |   | 7/2017 |           |
| CN | 109739426 A |   | 5/2019 |           |
| WO | WO-2018054251 A1 | * | 3/2018 | G06F 3/04886 |

* cited by examiner

OBJECT BATCHING METHOD AND APPARATUS

The present application is a continuation of International Patent Application No. PCT/CN2019/086781, titled "OBJECT BATCHING METHOD AND APPARATUS", filed on May 14, 2019, which claims priority to Chinese Patent Application No. 201810457977.4, titled "OBJECT BATCHING METHOD AND APPARATUS", filed on May 14, 2018 with the State Intellectual Property Office of People's Republic of China, both of which are incorporated herein by reference in their entireties.

FIELD

The present disclosure relates to the technical field of interaction processing, and in particular to a batch processing method and batch processing device for objects.

BACKGROUND

With the rapid development of information science and technology and the popularization of smart terminals, users may flexibly operate and process objects on interfaces of the smart terminals, and there are more and more objects to be operated and processed on the interfaces of the smart terminals, such as electronic documents, applications, videos and pictures.

In a case that multiple objects are to be operated and processed, there are problems with improving operational efficiency.

SUMMARY

A technical problem to be solved by the present disclosure is to provide a batch processing method and a batch processing device for objects, with which a batch processing operation can realized by simultaneously touching multiple objects with multiple fingers. The batch processing operation is performed simply and conveniently, which can save time and energy, thereby improving the user experience.

In a first aspect, a batch processing method for objects is provided according to an embodiment of the present disclosure, which includes:

acquiring, in response to an operation that a user simultaneously touches at least two objects on a user interface, first touch event related information with respect to the at least two objects:

acquiring, in response to an operation that the user stops touching the at least two objects on a batch processing interface, second touch event related information with respect to the at least two objects; and performing, if the first touch event related information with respect to the at least two objects and the second touch event related information with respect to the at least two objects meet an operation condition of a preset batch processing operation, the preset batch processing operation for the at least two objects.

In a second aspect, a batch processing device for objects is further provided according to an embodiment of the present disclosure. The device includes a first acquisition unit, a second acquisition unit, and a batch processing unit. The first acquisition unit is configured to acquire, in response to an operation that a user simultaneously touches at least two objects on a user interface, first touch event related information with respect to the at least two objects. The second acquisition unit is configured to acquire, in response to an operation that the user stops touching the at least two objects on a batch processing interface, second touch event related information with respect to the at least two objects. The batch processing unit is configured to perform, if the first touch event related information with respect to the at least two objects and the second touch event related information with respect to the at least two objects meet an operation condition of a preset batch processing operation, the preset batch processing operation for the at least two objects.

In a third aspect, a terminal device is further provided according to an embodiment of the present disclosure. The terminal device includes a processor and a memory. The memory is configured to store program codes and transmit the program codes to the processor. The processor is configured to perform, based on instructions in the program codes, the batch processing method for objects according to any embodiments of the first aspect.

In a fourth aspect, a computer-readable storage medium is further provided according to an embodiment of the present disclosure. The computer-readable storage medium is configured to store program codes, and the program codes is used to perform the batch processing method for objects according to any embodiments of the first aspect.

The present disclosure has at least the following advantages. With the technical solutions of the embodiments of the present disclosure, in response to an operation that a user simultaneously touches at least two objects on a user interface, first touch event related information with respect to the at least two objects is acquired. Based on the first touch event related information with respect to the at least two objects, the at least two objects and a touch state of the at least two objects are determined. Based on the touch state of the at least two objects, a batch processing operation is triggered to display a batch processing interface. In response to an operation that the user stops touching the at least two objects on the batch processing interface, second touch event related information with respect to the at least two objects is acquired. If the first touch event related information with respect to the at least two objects and the second touch event related information with respect to the at least two objects meet an operation condition of a preset batch processing operation, the preset batch processing operation is performed for the at least two objects. It can be seen that, at least two objects can be touched simultaneously for batch processing, that is, with this method, the batch processing operation can be performed by simultaneously touching multiple objects with multiple fingers. The batch processing operation is performed simply and conveniently, which saves time and energy, thereby improving the user experience.

BRIEF DESCRIPTION OF THE DRAWINGS

In order to explain the technical solutions of the embodiments of the present disclosure more clearly, drawings to be used in the description of the embodiments of the present disclosure will be briefly described in the following. Apparently, the drawings in the following description only show some embodiments of the present disclosure. For those skilled in the art, other drawings may be obtained from the drawings without any creative work.

DETAILED DESCRIPTION OF EMBODIMENTS

In order to make those skilled in the art to better understand the technical solutions of the present disclosure, the technical solutions in embodiments of the present disclosure will be clearly and completely described below in conjunction with drawings in the embodiments of the present disclosure. Apparently, the described embodiments are only some, rather than all of the embodiments of the present disclosure. Based on the embodiments of the present disclosure, all other embodiments obtained by those skilled in the art without any creative work should fall within the protection scope of the present disclosure.

In the embodiments of the present disclosure, firstly, in response to an operation that a user simultaneously touches at least two objects on a user interface, first touch event related information with respect to the at least two objects is acquired. Based on the first touch event related information with respect to the at least two objects, the at least two objects and a touch state of the at least two objects are determined. Next, based on the touch state of the at least two objects, a batch processing operation is triggered to display a batch processing interface. Next, in response to an operation that the user stops touching the at least two objects on the batch processing interface, second touch event related information with respect to the at least two objects is acquired. Finally, if the first touch event related information with respect to the at least two objects and the second touch event related information with respect to the at least two objects meet an operation condition of a preset batch processing operation, the preset batch processing operation is performed for the at least two objects. It can be seen that, at least two objects can be touched simultaneously for batch processing, that is, with this method, the batch processing operation can be performed by simultaneously touching multiple objects with multiple fingers. The batch processing operation is performed simply and conveniently, which saves time and energy, thereby improving the user experience.

Figure 1:
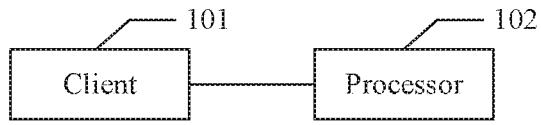
FIG. 1 is a schematic diagram of a system framework involved in an application scenario according to an embodiment of the present disclosure.

For example, one of scenarios to which an embodiment of the present disclosure may be applied may be as shown in FIG. 1. This scenario includes a client 101 and a processor 102. The client 101 and the processor 102 interact with each other. A user manually touches an object on a user interface displayed by the client 101. In response to an operation that the user simultaneously touches at least two objects on the user interface displayed by the client 101, the processor 102 acquires first touch event related information with respect to the at least two objects. The processor 102 determines the at least two objects and a touch state of the at least two objects based on the first touch event related information with respect to the at least two objects. The processor 102 triggers, based on the touch state of the at least two objects, a batch processing operation to update the user interface displayed by the client 101 with a batch processing interface. In response to an operation that the user stops touching the at least two objects on the batch processing interface displayed by the client 101, the processor 102 acquires second touch event related information with respect to the at least two objects. If the first touch event related information with respect to the at least two objects and the second touch event related information with respect to the at least two objects meet an operation condition of a preset batch operation, the processor 102 performs the preset batch processing operation for the at least two objects.

It is to be understood that, in the above application scenario, although operations in the embodiment of the present disclosure are described as being performed by the processor 102, these operations may also be performed by the client 101, or these operations may also be partly performed by the client 101 and partly performed by the processor 102. A performing subject is not limited in the present disclosure, as long as the operations in the embodiment of the present disclosure can be performed.

It is to be understood that the above scenario is only an example of application scenarios according to the embodiment of the present disclosure, and the embodiment of the present disclosure is not limited to this scenario.

The implementations of the batch processing method and the batch processing device for objects according to the embodiments of the present disclosure will be described in detail below with reference to the drawings.

Exemplary Method

Figure 2:
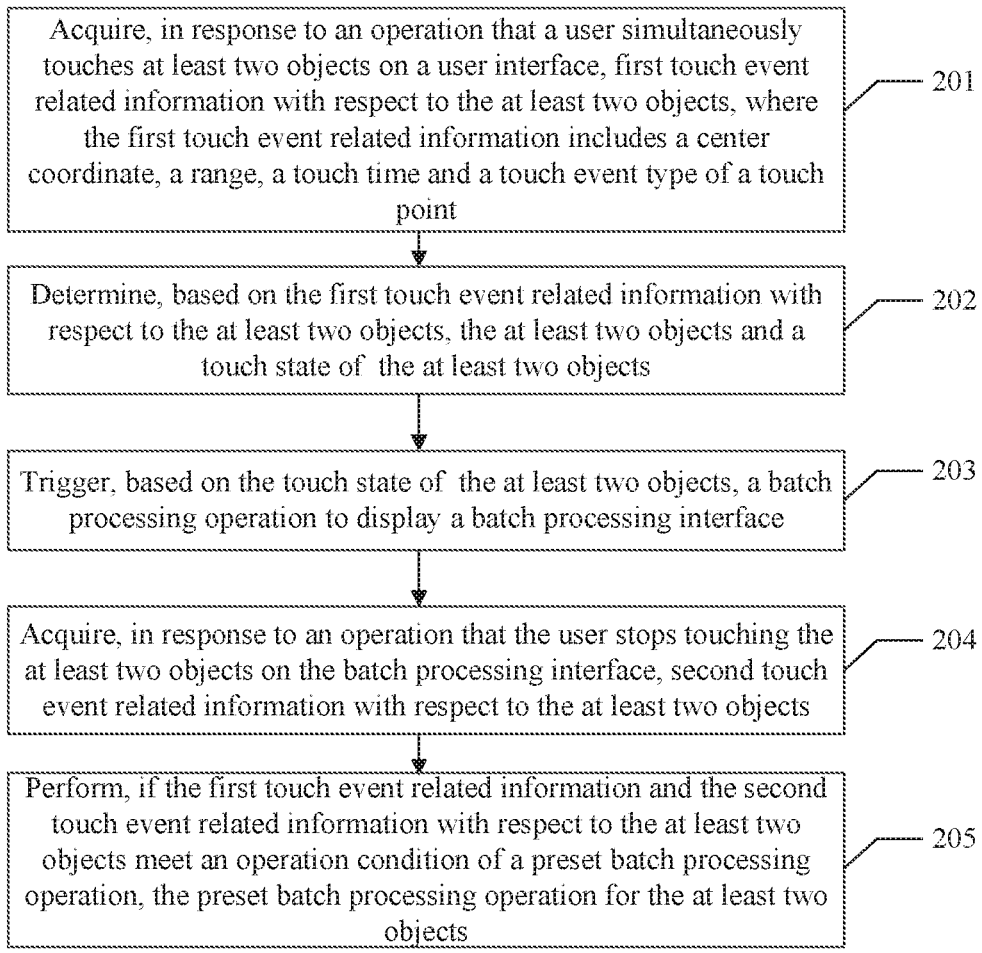
FIG. 2 is a schematic flowchart of a batch processing method for objects according to an embodiment of the present disclosure.

Referring to FIG. 2, which is a schematic flowchart of a batch processing method for objects according to an embodiment of the present disclosure. In the embodiment, the method may include, for example, the following steps 201 to 205.

In step 201, in response to an operation that a user simultaneously touches at least two objects on a user interface, first touch event related information with respect to the at least two objects is acquired, where the touch event related information includes a center coordinate, a range, a touch time and a touch event type of a touch point.

It is to be noted that during a process that the user touches, with a finger, an object on the user interface displayed by the client, when the finger touches the object, the processor acquires touch event related information on a touch point first touched by the finger, that is, a center coordinate, a range, a touch time, a touch event type, and the like of an initial touch point during an entire touch operation process. In this case, the touch event type is a down event indicating that the object is clicked and pressed. The situation where the user touches, with his finger, an object on the user interface displayed by the client is monitored, and when at least two objects are touched by fingers of the user, the processor may acquire at least touch event related information on touch points first touched by the fingers of the user that corresponds to the two objects. Therefore, in some implementations of this embodiment, the first touch event related information with respect to the at least two objects includes at least a center coordinate, a range, a touch time and a touch event type of an initial touch point of the at least two objects.

It is to be noted that in the process of monitoring the situation that the user touches, with the finger, an object on the user interface displayed by the client, the situation that at least two objects are touched by fingers of the user may include the following two cases.

Figure 3:
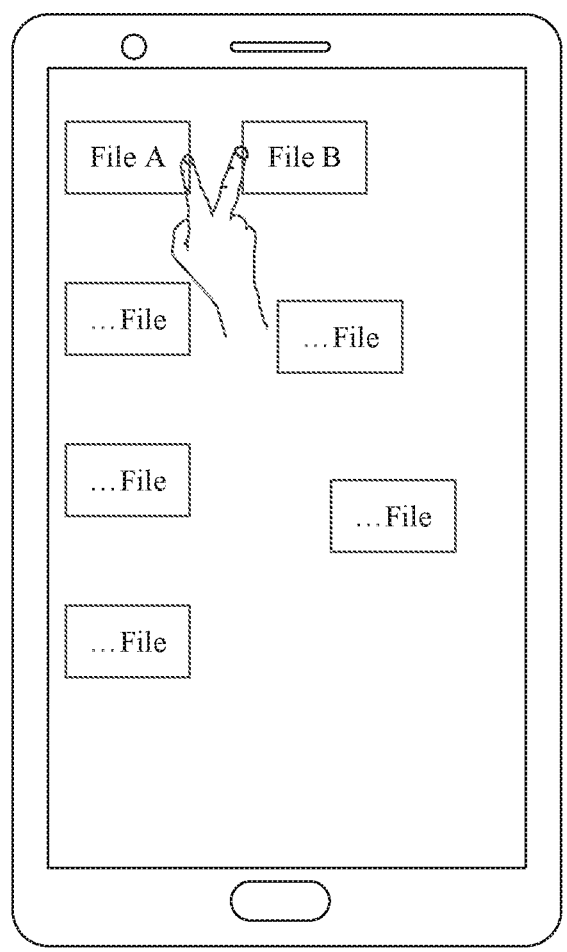
FIG. 3 is a schematic diagram of an operation that a user simultaneously touches at least two objects on a user interface according to an embodiment of the present disclosure.

In a first case, the user touches the at least two objects on the user interface displayed by the client with at least two fingers at the same time. For example, the user touches an object A on the user interface displayed by the client with one finger, and touches an object B on the same user interface with another finger at the same time. Therefore, in some implementations of this embodiment, the operation that the user simultaneously touches the at least two objects on the user interface is an operation that the user touches the at least two objects on the user interface at the same time. For example, as shown in FIG. 3, which is a schematic diagram of an operation that a user simultaneously touches at least two objects on the user interface, where the user touches the file A on the user interface displayed by the client with an index finger, and touches the file B on the same user interface with a middle finger at the same time.

In this case, at least two objects on the same user interface are touched at the same time, and the processor acquires a center coordinate, a range, a touch time and a touch event type, that is, a down event, of an initial touch point of the at least two objects during the entire touch operation process. Therefore, in some implementations of the embodiment, the first touch event related information with respect to the at least two objects includes a center coordinate, a range, a touch time and a touch event type of an initial touch point of the at least two objects.

Figure 4:
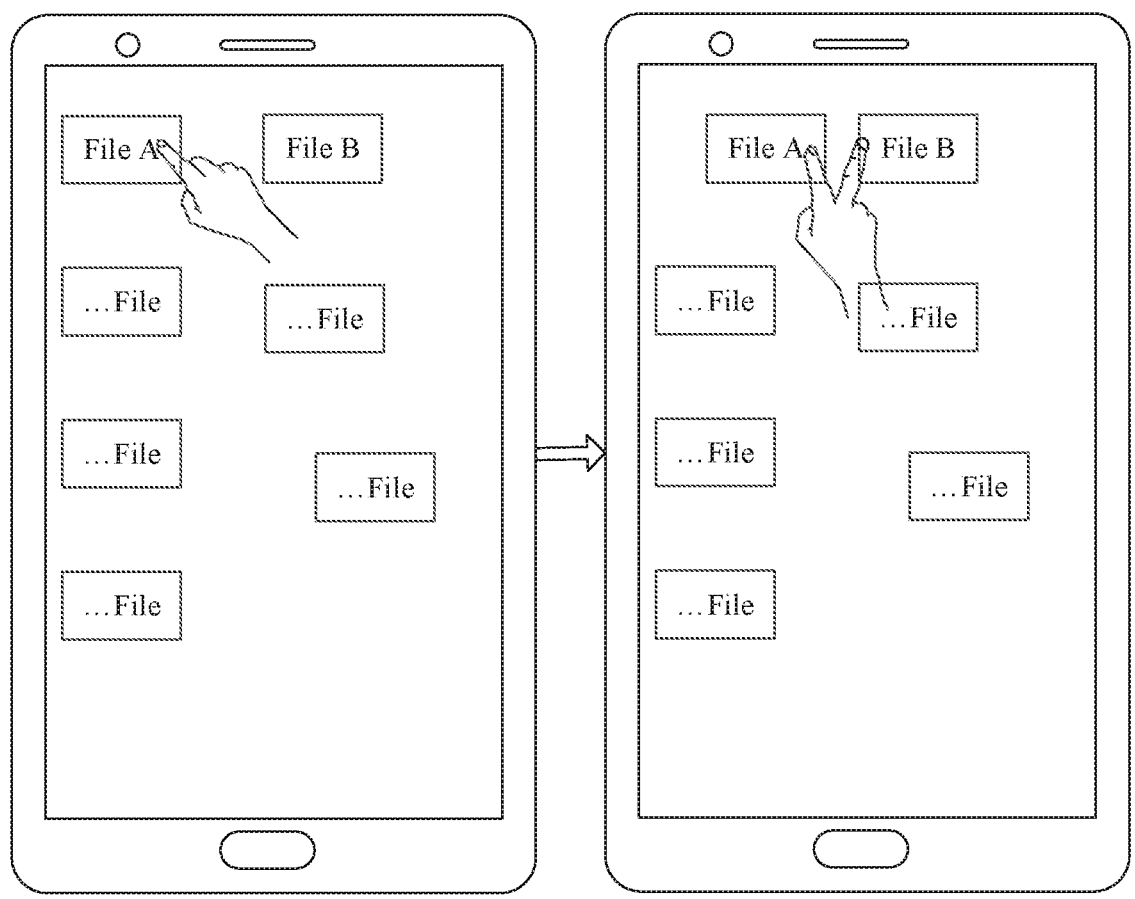
FIG. 4 is a schematic diagram of an operation in which a user simultaneously touches at least two objects on a user interface according to another embodiment of the present disclosure.

In a second case, the user first touches an object on the user interface displayed by the client with one finger, and before stopping the touch, the user touches another object on the same user interface with another finger. For example, during a process that the user touches the object A on the user interface displayed by the client with one finger, that is, before stopping the touch on the object A, the user touches the object B on the same user interface with another finger. Therefore, in some implementations of this embodiment, the operation that the user simultaneously touches the at least two objects on the user interface is an operation that the user touches another object on the same user interface while the user is touching an object on the user interface, the another object is different from the object on the user interface. For example, as shown in FIG. 4, which is a schematic diagram of another operation that a user simultaneously touches at least two objects on the user interface, where the user first touches the file A on the user interface displayed by the client with the index finger, and during a process of moving the file A while touching the file A and before stopping the touch and moving of the file A, the user touches the file B on the same user interface with the middle finger.

In this case, an object has been touched for a period of time, and another object on the same user interface is just touched, the processor acquires, for the object of the at least two objects, a center coordinate, a range, a touch time, and a down event type of an initial touch point, and a center coordinate, a range, a touch time, and a touch event type of each subsequent touch point during a touch operation process of the object. The touch event type of the subsequent touch point is, for example, a move event type. The processor also acquires a center coordinate, a range, a touch time, and a touch event type, that is, a down event type of an initial touch point of the another object during the entire touch operation process of the another object. Therefore, in some implementations of the embodiment, the first touch event related information with respect to the at least two objects includes a center coordinate, a range, a touch time, and a touch event type of each touch point during a touch operation process of the one object; and a center coordinate, a range, a touch time, and a touch event type of an initial touch point of the another object.

In step 202, the at least two objects and a touch state of the at least two objects are determined based on the first touch event related information with respect to the at least two objects.

It is to be understood that the first touch event related information with respect to the at least two objects includes at least a center coordinate, a range, a touch time, and a touch event type of an initial touch point of the at least two objects. Therefore, an object touched by the user with a finger may be determined based on the center coordinate and the range of the initial touch point of the at least two objects, and a current touch state of the object may be determined based on the touch time and the touch event type of the initial touch point of the at least two objects.

For example, when the user simultaneously touches the object A and the object B on the user interface, the object A and the object B may be determined based on the center coordinate and range of the initial touch point of each of the objects, and it is determined that both the object A and the object B are in the clicked and pressed state based on the touch time and the down event type of the initial touch point.

For example, during a process that the user moves the object A on the user interface while touching the object A, if the user touches the object B on the same user interface, the object A and the object B may be determined based on the center coordinate and range of the initial touch point of each of the objects, it is determined that the object B is in the clicked and pressed state based on the touch time and the down event type of the initial touch point of the object B, and it is determined that the object A is in a moving state based on the touch time and the down event type of the initial touch point and a touch time and a move event type of a subsequent touch point of the object A.

For example, during a process that the user touches the object A and presses the object A on the user interface for a long period of time, if the user touches the object B on the same interface, the object A and the object B may be determined based on a center coordinate and a range of the initial touch point, it may be determined that the object B is in the clicked and pressed state based on a touch time and a touch event type of an initial touch point of the object B, and it may be determined that object A is in the long-pressed state based on a touch time and a down event type of the initial touch point of the object A and a touch time and a down event type of the subsequent touch point of the object A.

In step 203, based on the touch state of the at least two objects, a batch processing operation is triggered to display a batch processing interface.

It is to be understood that if at least two objects are in a touched state, the batch processing operation may be directly triggered. In order to perform the batch processing operation, it is required to enter the batch processing interface. For example, if the object A and the object B are both in a clicked and pressed state, or if the object A is in a long-pressed state and the object B is in a clicked and pressed state, or if the object A is in a moving state and the object B is in a clicked and pressed state, the batch processing operation may be triggered to enter the batch processing interface.

It is to be noted that in a case that the user interface is displayed as a batch processing interface, the user may not know which batch processing operations may be performed. In order to inform the user which batch processing operations are available and display these batch processing operations to the user intuitively, prompts of some batch processing operations may be intuitively displayed on the interface in a form of graphics and/or text, so that the user can know which batch processing operations may be performed. For example, a text "removing" is displayed at the top of the batch processing interface to prompt the user that a removing batch processing operation may be performed if the user moves the object to the top of the interface. Therefore, in some implementations of the embodiment, after step 203, for example, the method may further include: prompting a preset batch processing operation on the batch processing interface.

Figure 5:
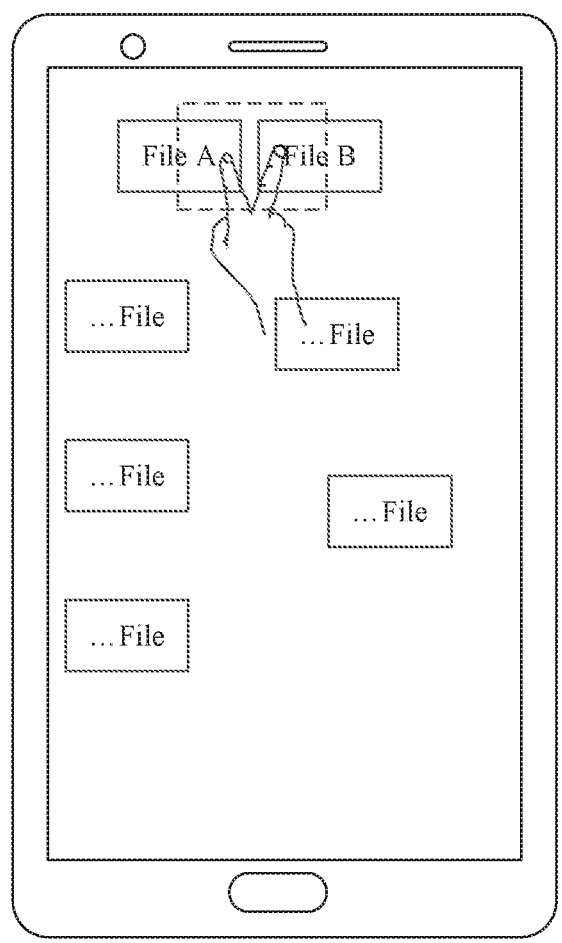
FIG. 5 is a schematic diagram of an operation for prompting a preset batch processing operation on a batch processing interface according to an embodiment of the present disclosure.

For example, as shown in FIG. 5, which is a schematic diagram of an operation for prompting a preset batch processing operation on a batch processing interface, where if a distance between the file A and the file B on the batch processing interface is small, a new folder is displayed between the two files, to prompt the user that a file merging batch processing operation may be performed if the user moves the file A and the file B to this folder.

It is also to be noted that in a case that the batch processing interface is displayed, the user may touch another object on the same interface than the at least two objects with another finger. In this case, the processor acquires a center coordinate, a range, a touch time and a touch event type, that is, a down event type, of an initial touch point of the another object, and performs the batch processing operation on the another object together with the at least two objects. For example, in a case that the user simultaneously touches the object A and the object B on the user interface and performs a gathering and moving operation, after the batch processing interface is displayed after step 201 to step 203, if the user touches the object C on the same user interface, a center coordinate, a range, a touch time, and a touch event type, that is, a down event type, of an initial touch point of the object C are acquired, to perform the batch processing operation on the object C together with the object A and the object B.

In step 204, in response to an operation that the user stops touching the at least two objects on the batch processing interface, second touch event related information with respect to the at least two objects is acquired.

Similarly, after the touch operation of the finger is performed, the processor acquires touch event related information other than the first touch event related information during the entire touch operation process, including at least touch event related information on a time when the finger leaves the object and touch event related information on a touch point where the finger stops touching the object, that is, a center coordinate, a range, a touch time, and a touch event type of a final touch point during the entire touch operation process. In this case, the touch event type is an up event indicating that the object is released and not pressed. Therefore, in some implementations of the embodiment, the second touch event related information with respect to the at least two objects includes at least a center coordinate, a range, a touch time and a touch event type of a final touch point of the at least two objects.

In step 205, if the first touch event related information with respect to the at least two objects and the second touch event related information with respect to the at least two objects meet an operation condition of a preset batch processing operation, the preset batch processing operation is performed for the at least two objects.

It is to be understood that each batch processing operation has a corresponding operation condition, and only the first touch event related information with respect to the at least two objects and the second touch event related information with respect to the at least two objects meet the operation condition of the preset batch processing operation, the batch processing operation may be performed for the at least two objects.

For example, in a case that the user simultaneously touches the file A and the file B on the user interface and then stops touching the file A and the file B, in order to perform the file merging batch processing operation, based on the first touch event related information and second touch event related information on each of the file A and the file B that are acquired through steps 201 to 204, if a distance between the file A and the file B is less than a preset distance, it means that the operation condition of the file merging batch processing operation is met, and the file merging batch processing operation is performed for the file A and the file B.

With the various implementations in the embodiment, firstly, in response to an operation that a user simultaneously touches at least two objects on a user interface, first touch event related information with respect to the at least two objects is acquired. Based on the first touch event related information with respect to the at least two objects, the at least two objects and a touch state of the at least two objects are determined. Next, based on the touch state of the at least two objects, a batch processing operation is triggered to display a batch processing interface. Next, in response to an operation that the user stops touching the at least two objects on the batch processing interface, second touch event related information with respect to the at least two objects is acquired. Finally, if the first touch event related information with respect to the at least two objects and the second touch event related information with respect to the at least two objects meet an operation condition of a preset batch processing operation, the preset batch processing operation is performed for the at least two objects. It can be seen that, at least two objects can be touched simultaneously for batch processing, that is, with this method, the batch processing operation can be performed by simultaneously touching multiple objects with multiple fingers. The batch processing operation is performed simply and conveniently, which saves time and energy, thereby improving the user experience.

Hereinafter, with reference to FIG. 6, by taking an operation that the user simultaneously touches the file A and file B on the user interface with two fingers to move and gather the file A and the file B to perform a file merging operation as an example, implementations of the batch processing method and device for objects are described in detail according to another embodiment of the present disclosure.

Figure 6:
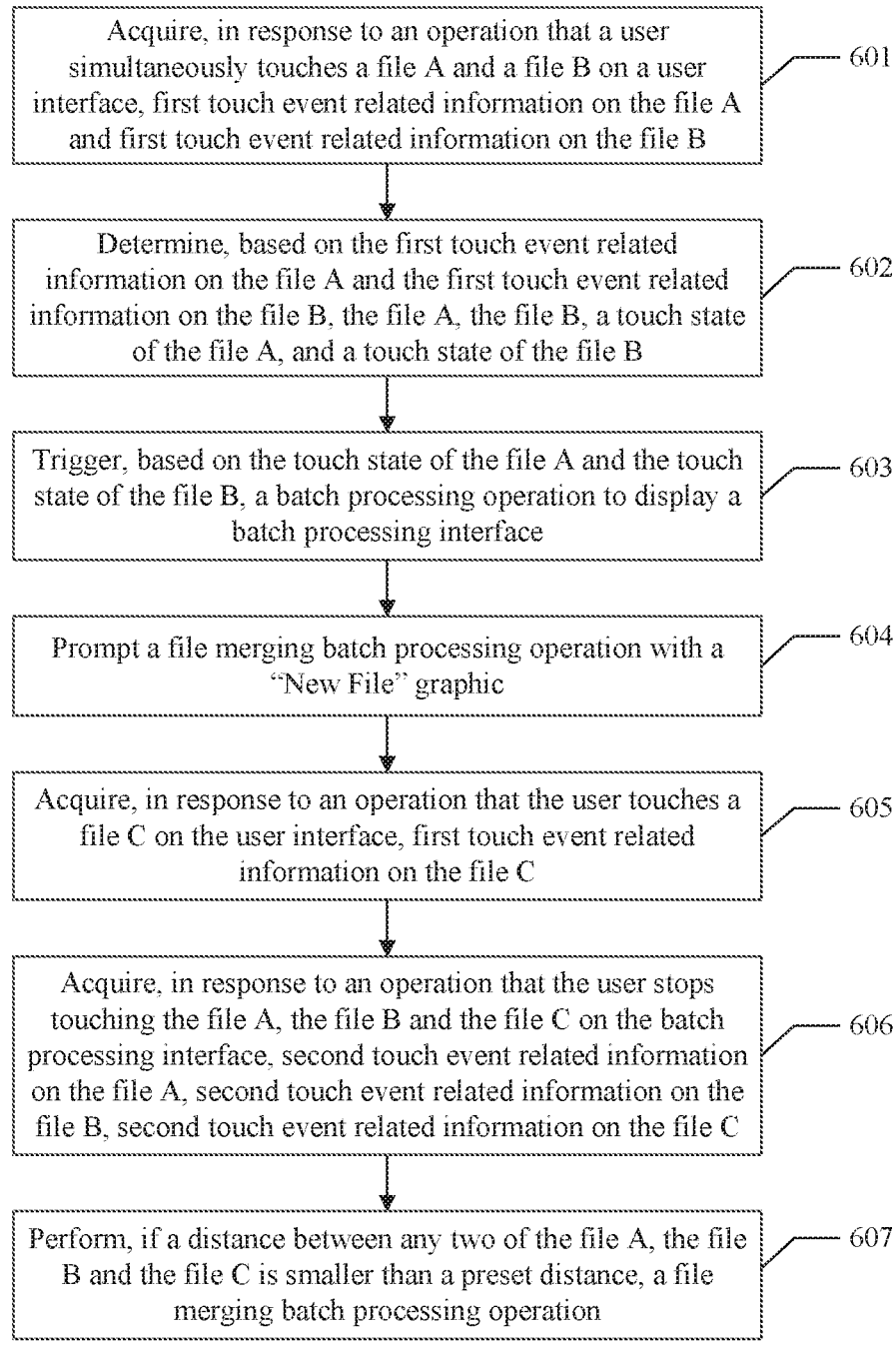
FIG. 6 is a schematic flowchart of a batch processing method for objects according to another embodiment of the present disclosure.

Reference is made to FIG. 6, which is a schematic flowchart of a batch processing method for objects according to an embodiment of the present disclosure. In this embodiment, the method may include, for example, the following steps 601 to 607.

In step 601, in response to an operation that a user simultaneously touches a file A and a file B on a user interface, first touch event related information on the file A and first touch event related information on the file B are acquired. The first touch event related information includes a center coordinate, a range, a touch time and a touch event type of an initial touch point.

In step 602, the file A, the file B, a touch state of the file A, and a touch state of the file B are determined based on the first touch event related information on the file A and the first touch event related information on the file B.

In step 603, based on the touch state of the file A and the touch state of the file B, a batch processing operation is triggered to display a batch processing interface.

In step 604, a file merging batch processing operation is prompted on the batch processing interface with a "New Folder" graphic.

In step 605, in response to an operation that the user touches a file C on the same user interface, first touch event related information on the file C is acquired.

In step 606, in response to an operation that the user stops touching the file A, the file B, and the file C on the batch processing interface, second touch event related information on the file A, second touch event related information on the file B, and second touch event related information on the file C are acquired. The second touch event related information includes a center coordinate, a range, a touch time, and a touch event type of a final touch point.

In step 607, if a distance between any two of the file A, the file B and the file C is less than a preset distance, a file merging batch processing operation is performed for the file A, the file B and the file C.

With the various implementations of the embodiment, firstly, in response to an operation that a user simultaneously touches at least two objects on a user interface, first touch event related information with respect to the at least two objects is acquired. Based on the first touch event related information with respect to the at least two objects, the at least two objects and a touch state of the at least two objects are determined. Next, based on the touch state of the at least two objects, a batch processing operation is triggered to display a batch processing interface. Next, in response to an operation that the user stops touching the at least two objects on the batch processing interface, second touch event related information with respect to the at least two objects is acquired. Finally, if the first touch event related information with respect to the at least two objects and the second touch event related information with respect to the at least two objects meet an operation condition of a preset batch processing operation, the preset batch processing operation is performed for the at least two objects. It can be seen that, at least two objects can be touched simultaneously for batch processing, that is, with this method, the batch processing operation can be performed by simultaneously touching multiple objects with multiple fingers. The batch processing operation is performed simply and conveniently, which saves time and energy, thereby improving the user experience.

Exemplary Device

Figure 7:
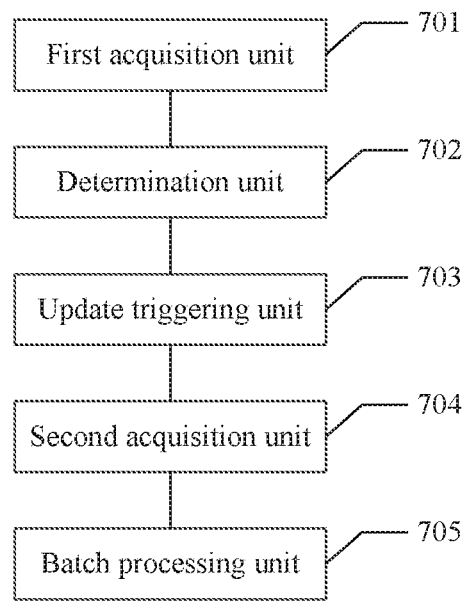
FIG. 7 is a schematic structural diagram of a batch processing device for objects according to an embodiment of the present disclosure.

Referring to FIG. 7, which is a schematic structural diagram of a batch processing device for objects according to an embodiment of the present disclosure. In the embodiment, the device may include a first acquisition unit 701, a second acquisition unit 704, and a batch processing unit 705.

The first acquisition unit 701 is configured to acquire, in response to an operation that a user simultaneously touches at least two objects on a user interface, first touch event related information with respect to the at least two objects.

The second acquisition unit 704 is configured to acquire, in response to an operation that the user stops touching the at least two objects on a batch processing interface, second touch event related information with respect to the at least two objects.

The batch processing unit 705 is configured to perform, if the first touch event related information with respect to the at least two objects and the second touch event related information with respect to the at least two objects meet an operation condition of a preset batch processing operation, the preset batch processing operation for the at least two objects.

In an embodiment, the first touch event related information with respect to the at least two objects includes at least a center coordinate, a range, a touch time, and/or a touch event type of an initial touch point of the at least two objects. The second touch event related information with respect to the at least two objects includes at least a center coordinate, a range, a touch time, and/or a touch event type of a final touch point of the at least two objects.

In an embodiment, the operation that the user simultaneously touches at least two objects on a user interface includes an operation that the user touches the at least two objects on the user interface at the same time.

In an embodiment, the operation that the user simultaneously touches at least two objects on a user interface includes an operation that the user touches another object on the user interface in a case that the user is touching one object on the same user interface. The another object is different from the one object on the user interface.

In an embodiment, the first touch event related information with respect to the at least two objects includes: a center coordinate, a range, a touch time, and/or a touch event type of each touch point during a touch operation process of the one object; and a center coordinate, a range, a touch time and/or a touch event type of an initial touch point of the another object.

In an embodiment, the device further includes a prompting unit (not shown in FIG. 7) configured to prompt a preset batch processing operation on a batch processing interface.

In an embodiment, the device further includes a determination unit 702 and a display triggering unit 703. Before the second acquisition unit 704 acquires the second touch event related information with respect to the at least two objects in response to the operation that the user stops touching the at least two objects on the batch processing interface, the determination unit 702 is configured to determine the at least two objects and a touch state of the at least two objects based on the first touch event related information with respect to the at least two objects. The display triggering unit 703 is configured to display the batch processing interface based on the touch state of the at least two objects.

In an embodiment, the determination unit 702 is further configured to:

determine a touched object based on a center coordinate and a range of an initial touch point of the at least two objects; and determine a current touch state of the touched object based on a touch time and a touch event type of an initial touch point of the at least two objects.

In an embodiment, the device further includes a third acquisition unit (not shown in FIG. 7). After the display triggering unit 703 triggers to display the batch processing interface based on the touch state of the at least two objects, and before the second acquisition unit 704 acquires the second touch event related information with respect to the at least two objects in response to the operation that the user stops touching the at least two objects on the batch processing interface, the third acquisition unit is configured to receive a touch operation of the user on another object on the interface than the at least two objects; and acquire first touch event related information on an initial touch point of the another object.

Accordingly, the second acquisition unit 704 is further configured to acquire second touch event related information with respect to the at least two objects and the another object.

Accordingly, the batch processing unit 705 is further configured to perform, if the first touch event related information with respect to the at least two objects and the another object and the second touch event related information with respect to the at least two objects and the another object meet the operation condition of the preset batch processing operation, the preset batch processing operation for the at least two objects and the another object.

In an embodiment, the at least two objects and the another object are files, and the operation condition of the preset batch processing operation include: a distance between any two of the at least two objects and the another object is less than a preset distance.

The batch processing unit 705 is further configured to perform, if a distance between any two of the at least two files and the another file is less than a preset distance, the file merging batch processing operation for the at least two files and the another file.

With various implementations in the embodiment, the first acquisition unit is configured to acquire, in response to an operation that a user simultaneously touches at least two objects on a user interface, first touch event related information with respect to the at least two objects. The determination unit is configured to determine the at least two objects and a touch state of the at least two objects based on the first touch event related information with respect to the at least two objects. The display triggering unit is configured to trigger to display the batch processing interface based on the touch state of the at least two objects. The second acquisition unit is configured to acquire, in response to an operation that the user stops touching the at least two objects on a batch processing interface, second touch event related information with respect to the at least two objects. The batch processing unit is configured to perform, if the first touch event related information with respect to the at least two objects and the second touch event related information with respect to the at least two objects meet an operation condition of a preset batch processing operation, the preset batch processing operation for the at least two objects. It can be seen that, at least two objects can be touched simultaneously for batch processing, that is, with this device, the batch processing operation can be performed by simultaneously touching multiple objects with multiple fingers. The batch processing operation is performed simply and conveniently, which saves time and energy, thereby improving the user experience.

In an embodiment the determination unit is further configured to determine, based on a center coordinate and a range of an initial touch point of the at least two objects, an object touched by the user with a finger; and determine, based on a touch time and a touch event type of an initial touch point of the at least two objects, a current touch state of the object.

In an embodiment, the first acquisition unit is further configured to: receive, after the display triggering unit triggers a batch processing operation to display a batch processing interface based on the touch state of the at least two objects, and before the second acquisition unit acquires the second touch event related information with respect to the at least two objects in response to the operation that the user stops touching the at least two objects on the batch processing interface, an touch operation of the user on another object on the user interface than the at least two objects; and acquire first touch event related information on an initial touch point of the another object. The second acquisition unit is further configured to acquire second touch event related information with respect to the at least two objects and the another object. The batch processing unit is further configured to perform, if the first touch event related information with respect to the at least two objects and the another object and the second touch event related information with respect to the at least two objects and the another object meet an operation condition of a preset batch processing operation, the preset batch processing operation for the at least two objects and the another object.

In an embodiment, the at least two objects and the another object are files, and the operation condition of the preset batch processing operation include: a distance between any two of the at least two objects and the another object is less than a preset distance. The batch processing unit is further configured to perform, if a distance between any two of the at least two files and the another files is less than the preset distance, a file merging batch processing operation for the at least two files and the another file.

Figure 8:
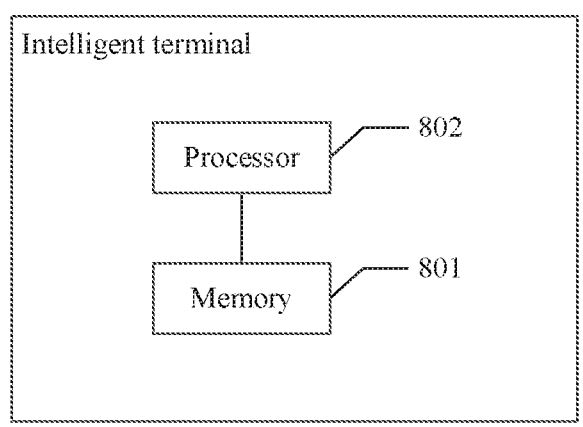
FIG. 8 is a schematic structural diagram of a terminal device according to an embodiment of the present disclosure.

A terminal device is further provided according to an embodiment of the present disclosure. As shown in FIG. 8, for ease of description, only parts related to the embodiment of the present disclosure are shown. For specific technical details that are not disclosed, please refer to the method part of the embodiment of the present disclosure. The terminal device includes a processor 801 and a memory 802.

The memory 802 is configured to store program codes and transmit the program codes to the processor.

The processor 801 is configured to perform, according to instructions in the program codes, any one of implementations of the batch processing method for objects according to the above embodiments.

The terminal device may be any terminal device such as a smart phone, a tablet computer, a personal digital assistant (PDA), and a large-screen all-in-one machine.

A computer-readable storage medium is further provided according to an embodiment of the present disclosure. The computer-readable storage medium is configured to store program codes, and the program codes are used to perform any one of implementations of the batch processing method for objects according to the above embodiments.

The various embodiments in this specification are described in a progressive manner.

Each embodiment focuses on the differences from other embodiments, and the same or similar parts between the various embodiments can be referred to each other. For the device disclosed in the embodiment, since it corresponds to the method disclosed in the embodiment, the description thereof is simple, and the relevant part can be referred to the description of the method part.

Those skilled in the art can further realize that the units and algorithm steps of the examples described in the embodiments disclosed herein can be implemented by electronic hardware, computer software, or a combination thereof. In order to clearly illustrate the interchangeability of hardware and software, in the above description, the composition and steps of each example have been generally described in accordance with the functions. Whether these functions are executed by hardware or software depends on the specific application and design constraint conditions of the technical solution. Those skilled in the art can implement the described functions by using different methods for each specific application, but such implementation should not be considered beyond the scope of the present disclosure.

It is to be noted that in this specification, relational terms such as "first" and "second" are only used to distinguish one entity or operation from another entity or operation, and do not necessarily require or imply that there is any actual relationship or order between these entities or operations. The terms "include", "comprise" or any other variants thereof are intended to cover non-exclusive inclusion, so that a process, a method, an article or a device including a series of elements not only includes those elements, but also includes other elements not explicitly listed, or also include elements inherent to such processes, methods, articles, or device. If there are no more restrictions, the element defined by the sentence "including a . . . " does not exclude the existence of other same elements in the process, method, article, or device including the element.

The above only describes the preferred embodiments of the present disclosure, and do not limit the present disclosure in any form. Although the present disclosure is disclosed as above with preferred embodiments, it is not intended to limit the present disclosure. Anyone familiar with the art, without departing from the scope of the technical solution of the present disclosure, can use the methods and technical content disclosed above to make many possible changes and modifications to the technical solution of the present disclosure, or modify the technical solution of the present disclosure into equivalent embodiments. Therefore, any simple amendments, equivalent changes and modifications made to the above embodiments based on the technical essence of the present disclosure without departing from the content of the technical solution of the present disclosure should fall within the protection scope of the technical solution of the present disclosure.

The invention claimed is:

1. A batch processing method for objects, comprising:
    acquiring, in response to an operation that a user simultaneously touches at least two objects on a first user interface, first touch event related information with respect to the at least two objects;
    determining touch states corresponding to the at least two objects based on the first touch event related information;
    displaying a second user interface based on the touch states corresponding to the at least two objects;
    acquiring, in response to an operation that the user stops touching the at least two objects on the second user interface, second touch event related information with respect to the at least two objects;
    determining whether the first touch event related information and the second touch event related information meet an operation condition of a preset batch processing operation;
    performing the preset batch processing operation for the at least two objects in response to a determination that the first touch event related information and the second touch event related information meet the operation condition of the preset batch processing operation;
    wherein the at least two objects are files, and the operation condition of the preset batch processing operation comprises a distance between any two of the at least two objects is less than a preset distance; and
    wherein the performing the preset batch processing operation for the at least two objects further comprises performing, when the distance between any two of at least two files is less than the preset distance, a file merging batch processing operation for the at least two files.

2. The method according to claim 1, wherein
    the first touch event related information with respect to the at least two objects comprises at least one of a center coordinate, a range, a touch time and a touch event type of at least one initial touch point corresponding to each of the at least two objects on the first user interface; and
    the second touch event related information with respect to the at least two objects comprises at least one of a second center coordinate, a second range, a second touch time and a second touch event type of a final touch point corresponding to each of the at least two objects on the second user interface.

3. The method according to claim 2, further comprising:
    determining, based on the first touch event related information with respect to the at least two objects, the at least two objects and the touch states of the at least two objects, wherein the determining, based on the first touch event related information with respect to the at least two objects, the at least two objects and the touch states of the at least two objects further comprises:
        determining the at least two objects based on the center coordinate and the range of the at least one corresponding touch point on each of the at least two objects; and
        determining the touch states corresponding to the at least two objects based on the touch time and the touch event type of the at least one corresponding touch point on each of the at least two objects.

4. The method according to claim 1, wherein the operation that a user simultaneously touches at least two objects on a first user interface comprises:
    an operation that the user touches the at least two objects on the first user interface at the same time; or
    an operation that the user touches the at least two objects on the first user interface for an overlapped period of time.

5. The method according to claim 1, wherein the operation that a user simultaneously touches at least two objects on a first user interface comprises:
    an operation that the user touches another object on the first user interface when the user is touching one object on the user interface, wherein the another object is different from the one object on the first user interface.

6. The method of claim 1, further comprising:
    displaying an indicator indicative of the preset batch processing operation on the second user interface.

7. The method according to claim 1, wherein after the displaying the second user interface based on the touch states corresponding to the at least two objects and before the acquiring, in response to an operation that the user stops touching the at least two objects on the second user interface, second touch event related information with respect to the at least two objects, the method further comprises:
    receiving a touch operation of the user on another object than the at least two objects on the second user interface; and
    acquiring first touch event related information on an initial touch point of the another object;
    wherein the acquiring, in response to an operation that the user stops touching the at least two objects on the second user interface, second touch event related information with respect to the at least two objects comprises:

acquiring second touch event related information with respect to the at least two objects and the another object; and wherein the performing the preset batch processing operation for the at least two objects further comprises:

performing the preset batch processing operation for the at least two objects and the another object in response to a determination that the first touch event related information with respect to the at least two object and the another object and the second touch event related information with respect to the at least two objects and the another object meet an operation condition of the preset batch processing operation with respect to the at least two object and the another object.

8. A batch processing method for objects, comprising:

acquiring, in response to an operation that a user simultaneously touches at least two objects on a first user interface, first touch event related information with respect to the at least two objects;

determining touch states corresponding to the at least two objects based on the first touch event related information;

displaying a second user interface based on the touch states corresponding to the at least two objects;

acquiring, in response to an operation that the user stops touching the at least two objects on the second user interface, second touch event related information with respect to the at least two objects;

determining whether the first touch event related information and the second touch event related information meet an operation condition of a preset batch processing operation;

performing the preset batch processing operation for the at least two objects in response to a determination that the first touch event related information and the second touch event related information meet the operation condition of the preset batch processing operation;

wherein after the displaying the second user interface based on the touch states corresponding to the at least two objects and before the acquiring, in response to an operation that the user stops touching the at least two objects on the second user interface, second touch event related information with respect to the at least two objects, the method further comprises:

receiving a touch operation of the user on another object than the at least two objects on the second user interface; and acquiring first touch event related information on an initial touch point of the another object;

wherein the acquiring, in response to an operation that the user stops touching the at least two objects on the second user interface, second touch event related information with respect to the at least two objects comprises:

acquiring second touch event related information with respect to the at least two objects and the another object; and wherein the performing the preset batch processing operation for the at least two objects further comprises:

performing the preset batch processing operation for the at least two objects and the another object in response to a determination that the first touch event related information with respect to the at least two object and the another object and the second touch event related information with respect to the at least two objects and the another object meet an operation condition of the preset batch processing operation with respect to the at least two object and the another object.

9. A batch processing apparatus for objects, comprising:
at least one processor; and
at least one memory communicatively coupled to the at least one processor and storing instructions that upon execution by the at least one processor cause the apparatus to:

acquire, in response to an operation that a user simultaneously touches at least two objects on a first user interface, first touch event related information with respect to the at least two objects;

determine touch states corresponding to the at least two objects based on the first touch event related information;

display a second user interface based on the touch states corresponding to the at least two objects;

acquire, in response to an operation that the user stops touching the at least two objects on the second user interface, second touch event related information with respect to the at least two objects;

determine whether the first touch event related information and the second touch event related information meet an operation condition of a preset batch processing operation;

perform the preset batch processing operation for the at least two objects in response to a determination that the first touch event related information and the second touch event related information meet the operation condition of the preset batch processing operation;

wherein the at least two objects are files, and the operation condition of the preset batch processing operation comprises a distance between any two of the at least two objects is less than a preset distance; and wherein the at least one memory further storing instructions that upon execution by the at least one processor cause the apparatus to perform, when the distance between any two of at least two files is less than the preset distance, a file merging batch processing operation for the at least two files.

10. The apparatus according to claim 9, wherein
the first touch event related information with respect to the at least two objects comprises at least one of a center coordinate, a range, a touch time and a touch event type of at least one initial touch point corresponding to each of the at least two objects on the first user interface; and the second touch event related information with respect to the at least two objects comprises at least one of a second center coordinate, a second range, a second touch time and a second touch event type of a final touch point corresponding to each of the at least two objects on the second user interface.

11. The apparatus according to claim 10, wherein the at least one memory further storing instructions that upon execution by the at least one processor cause the apparatus to:

determine the at least two objects based on the center coordinate and the range of the at least one corresponding touch point on each of the at least two objects; and determine the touch states corresponding to the at least two objects based on the touch time and the touch event type of the at least one corresponding touch point on each of the at least two objects.

12. The apparatus according to claim 9, wherein the operation that a user simultaneously touches at least two objects on a first user interface comprises:

an operation that the user touches the at least two objects on the user interface at the same time; or an operation that the user touches the at least two objects on the first user interface for an overlapped period of time.

13. The apparatus according to claim 9, wherein the operation that a user simultaneously touches at least two objects on a user interface comprises:

an operation that the user touches another object on the first user interface when the user is touching one object on the first user interface, wherein the another object is different from the one object on the user interface.

14. The apparatus according to claim 9, wherein the at least one memory further storing instructions that upon execution by the at least one processor cause the apparatus to:

receive a touch operation of the user on another object than the at least two objects on the second user interface before acquiring, in response to an operation that the user stops touching the at least two objects on the second user interface, the second touch event related information with respect to the at least two objects; and acquire first touch event related information on an initial touch point of the another object;

wherein the acquiring, in response to an operation that the user stops touching the at least two objects on the second user interface, second touch event related information with respect to the at least two objects comprises:

acquiring second touch event related information with respect to the at least two objects and the another object; and wherein the performing, the preset batch processing operation for the at least two objects comprises:

performing the preset batch processing operation for the at least two objects and the another object in response to a determination that the first touch event related information with respect to the at least two object and the another object and the second touch event related information with respect to the at least two objects and the another object meet an operation condition of the preset batch processing operation with respect to the at least two object and the another object.

15. A non-transitory computer-readable storage medium, bearing computer-readable instructions that upon execution on a computing device cause the computing device at least to:

acquire, in response to an operation that a user simultaneously touches at least two objects on a first user interface, first touch event related information with respect to the at least two objects;

determine touch states corresponding to the at least two objects based on the first touch event related information;

display a second user interface based on the touch states corresponding to the at least two objects;

acquire, in response to an operation that the user stops touching the at least two objects on the second user interface, second touch event related information with respect to the at least two objects;

determine whether the first touch event related information and the second touch event related information meet an operation condition of a preset batch processing operation;

perform the preset batch processing operation for the at least two objects in response to a determination that the first touch event related information and the second touch event related information meet the operation condition of the preset batch processing operation;

wherein the at least two objects are files, and the operation condition of the preset batch processing operation comprises a distance between any two of the at least two objects is less than a preset distance; and wherein the non-transitory computer-readable storage medium further comprises instructions that upon execution on the computing device cause the computing device to perform, when the distance between any two of at least two files is less than the preset distance, a file merging batch processing operation for the at least two files.

16. The non-transitory computer-readable storage medium of claim 15, wherein the first touch event related information with respect to the at least two objects comprises at least one of a center coordinate, a range, a touch time and a touch event type of at least one initial touch point corresponding to each of the at least two objects on the first user interface; and wherein the second touch event related information with respect to the at least two objects comprises at least one of a second center coordinate, a second range, a second touch time and a second touch event type of a final touch point corresponding to each of the at least two objects on the second user interface.

17. The non-transitory computer-readable storage medium of claim 16, further comprising computer-readable instructions that upon execution on the computing device cause the computing device at least to:

determine the at least two objects based on the center coordinate and the range of the at least one corresponding touch point on each of the at least two objects; and determine the touch states corresponding to the at least two objects based on the touch time and the touch event type of the at least one corresponding touch point on each of the at least two objects.

18. The non-transitory computer-readable storage medium of claim 15, wherein the operation that a user simultaneously touches at least two objects on a first user interface further comprises:

an operation that the user touches the at least two objects on the first user interface at the same time; or an operation that the user touches the at least two objects on the first user interface for an overlapped period of time.

19. The non-transitory computer-readable storage medium of claim 15, further comprising computer-readable instructions that upon execution on the computing device cause the computing device at least to:

display an indicator indicative of the preset batch processing operation on the second user interface.

* * * * *